US005359321A

United States Patent [19]

Ribic

[11] Patent Number: 5,359,321

[45] Date of Patent: Oct. 25, 1994

[54] REMOTE CONTROL DEVICE FOR CONTROLLING APPARATUSES CARRIED ON THE BODY, IN PARTICULAR HEARING AIDS

[75] Inventor: Zlatan Ribic, Vienna, Austria

[73] Assignee: Viennatone Gesellschaft m.b.H., Vienna, Austria

[21] Appl. No.: 924,179

[22] Filed: Aug. 3, 1992

[30] Foreign Application Priority Data

Aug. 14, 1991 [AT] Austria ................................ 1605/91

[51] Int. Cl.[5] ................................ H04Q 1/00

[52] U.S. Cl. ................................ 340/825.06; 381/68; 340/825.69; 324/226

[58] Field of Search ................................ 340/825.06, 825.15, 340/825.72, 825.69; 381/68; 324/226, 207.24

[56] References Cited

U.S. PATENT DOCUMENTS

| | | | |
|---|---|---|---|
| 4,006,462 | 2/1977 | Podowski | 340/825.72 |
| 4,057,805 | 11/1977 | Dowling | 340/825.72 |
| 4,114,099 | 9/1978 | Hollander | 340/825.72 |
| 4,214,229 | 7/1980 | Warner | 340/825.72 |
| 4,467,145 | 8/1984 | Borstel | 381/68 |

FOREIGN PATENT DOCUMENTS

| | | |
|---|---|---|
| 379929 | 3/1986 | Austria . |
| 3109049 | 9/1982 | Fed. Rep. of Germany . |

*Primary Examiner*—Donald J. Yusko
*Assistant Examiner*—Brian Zimmerman
*Attorney, Agent, or Firm*—Collard & Roe

[57] ABSTRACT

Remote control device for controlling apparatuses to be carried on the body, in particular hearing aids, and being provided with a circuit responsive to control signals. In order to give the remote control device a particularly simple and reliable design, it is provided that the remote control device comprises a permanent magnet (3) which is separate from the device (2, 8) to be controlled, and that the apparatus (2, 8) comprises at least one sensor (3; 10A, 10B) sensitive to a magnetic field and acting on a control circuit (20) via a signal converter circuit (6, 7, 12, 14; 13, 15) if so required.

9 Claims, 2 Drawing Sheets

REMOTE CONTROL DEVICE FOR CONTROLLING APPARATUSES CARRIED ON THE BODY, IN PARTICULAR HEARING AIDS

BACKGROUND OF THE INVENTION

1. Field of the Invention

The invention relates to a remote control device for controlling apparatuses carried on the body, in particular hearing aids comprising a device responding to a magnetic field, for example, of a magnet separated from the device to be controlled. The responsive device controls a device assuming various defined switching conditions.

2. The Prior Art

A remote control device was proposed, for example, by AT 379 929. In this known solution a single-channel acoustic remote control is provided with an activatable transmitter which transmits signals modulated on a carrier frequency which lie within the response range of a microphone of an allocated hearing aid. A frequency-selective circuit is disposed behind the microphone for separating the control signals from the voice signals. A control circuit is disposed in the signal path for processing the voice signals. A decoder acting on said control signal is disposed in the signal path for processing the control signals.

This remote control device overcomes the difficulties in the operation of the apparatuses, in particular hearing aids, caused by their miniaturization. Thus, particularly persons of advanced age, who usually have a reduced fine motor skills, have difficulties in manually setting the very small adjustment members of hearing aids, for example the volume control. In the known solution, however, a separate power supply is required. Furthermore, the remote control has to be arranged relatively large so as to enable the simple operation by the user.

Furthermore, from the DE-OS 31 09 049 a remote control device of the type mentioned above is known. In this known solution a device responsive to a magnetic field simultaneously forms a device having various, defined switching conditions. This is the case in a reed switch in which the movable contact can be magnetized and thus not only forms the switching device, but also simultaneously a device responsive to a magnetic field. But also magnetic field semiconductor switches were proposed which also form devices responsive to the magnetic field and, at the same time, elements representing the switching device.

Both cases, however, lead to the fact that the switching condition of the switching device only depends on the existence or non-existence of a sufficiently strong magnetic field and that the switching condition of the respectively selected element only remains in the working position as long as a magnet is in the vicinity of the device responsive to the magnetic field. If said magnet is removed, the switching device returns to its rest position.

This, however, is disadvantageous for many applications, because in order to maintain a certain switching condition it is necessary to maintain a respectively strong magnetic field.

SUMMARY OF THE INVENTION

It is the object of the invention to propose a remote control device of the type mentioned above in which an activatable transmitter is no longer required and which is characterized by a simple arrangement and a high degree of operating convenience.

This is achieved in accordance with the invention in that the device responsive to the magnetic field is formed by at least one sensor responsive to a magnetic field, which sensor is connected to a switching device via a memory circuit, whereby, if required, a signal shaping device is provided ahead of the memory circuit.

These measures enable the simple control of the device by simply moving the magnet past the device. The magnet can be kept very small, so that it can be built into, for example, a ring, a wrist-watch or a bracelet. This also leads to the advantage that in this case there is hardly the danger of loss or misplacement of the remote control. Furthermore, in the event of loss of the pertinent magnet it can be replaced by any other magnet, so that there is hardly the danger of any failure of the device by the loss of the magnet, because it can be replaced very easily, which is not the case in the known solutions with active components. Furthermore, the solution in accordance with the invention does not require batteries for the remote control, so that problems caused by empty batteries, which is the case in the known solutions, do not occur.

Furthermore, the solution in accordance with the invention leads to very high operating convenience, because the user only has to briefly move the magnet past the sensor.

In accordance with a further feature of the invention it may be provided that the device responsive to a magnetic field comprises at least two sensors disposed at a distance from one another, whose outputs are connected with a logic circuit which recognizes the sequence of activation of the sensors and whose outputs are connected with the memory circuit.

By using these measures it is possible to transmit already two different commands to the device to be controlled depending on the direction in which the magnet is moved past the device to be controlled. This allows, for example, to reduce or increase the volume of a hearing aid. Thus, for example, it would be sufficient to provide an incremental counter behind the logic circuit. The incremental counter would increase or decrease its output value by one depending on the direction by which the magnet is moved past the sensors. With such a counter it is possible to simply control a common electronic step potentiometer which influences the volume.

It may be further provided that the device responsive to the magnetic field comprises at least two pairs of sensors which are arranged along geometrical axes which cross one another.

In this manner it is possible to transmit different commands with the magnet to the device. For example, the hearing aid may allow influencing a tone control circuit in addition to the volume.

In principle it is also possible to provide more than two pairs of sensors, which allows a respectively higher number of commands to be transmitted to the device to be controlled.

A very simple arrangement of the sensors is achieved if the sensors are evenly distributed on a circular line and if the sensors forming a pair are disposed diametrically opposite of one another.

Sensors for recognizing changes in the magnetic field in the ultimate vicinity of the device to be controlled may be inductive pickups ("telephone coils"), Hall probes, magnetoresistors, flux gates or also simple reed switches. For reasons of low power consumption passive components such as coils, magnetoresistors or reed switches are preferable.

In accordance with a further feature of the invention it may be provided that the sensors are evenly distributed along a circular line and that the sensors forming pairs are disposed diametrically opposite of one another.

Such an arrangement is particularly suitable for arranging a larger number of sensors for allowing the transmission of a larger number of different commands.

It may be further provided that the logic circuit, which recognizes the sequence of activation of the sensors, comprises branches which are each allocated to a sensor and which each comprise an AND gate and, disposed behind said gate, a monoflop with two outputs each, whereby the one outputs of the two monoflops are connected with the one inputs of the AND gate disposed in the respectively other branch so as to form an interlocking circuit, and the other outputs of the monoflops are connected with inputs controlling the counting direction of an incremental counter whose counter input is connected with the output of the AND gate and whose inputs are connected with the outputs of monoflops each provided behind a sensor, which outputs are also connected with the AND gates of the interlocking circuit.

BRIEF DESCRIPTION OF THE DRAWINGS

The invention is now outlined in greater detail by reference to the enclosed drawings in which.

DETAILED DESCRIPTION OF THE PREFERRED EMBODIMENTS

Figure 1:
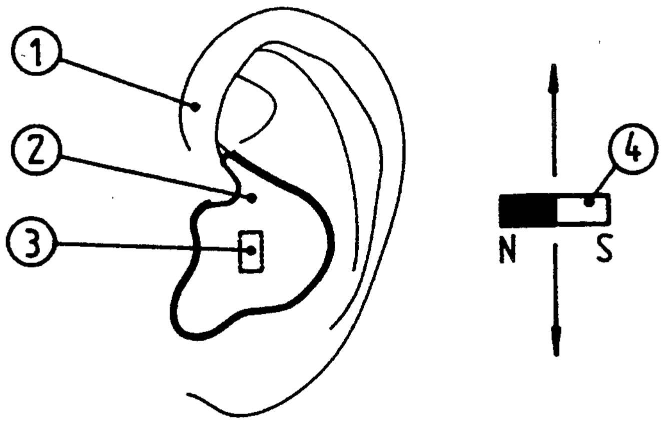
FIG. 1 schematically shows an application of the remote control device in accordance with the invention in a hearing aid.

In the embodiment in accordance with FIG. 1 the hearing aid 2, which is situated in the ear conch 1 and is a so-called "ear seated hearing aid" comprises a sensor 3 responsive to a magnetic field, which sensor controls an on-off switch of the hearing aid through a detector circuit.

Figure 2:
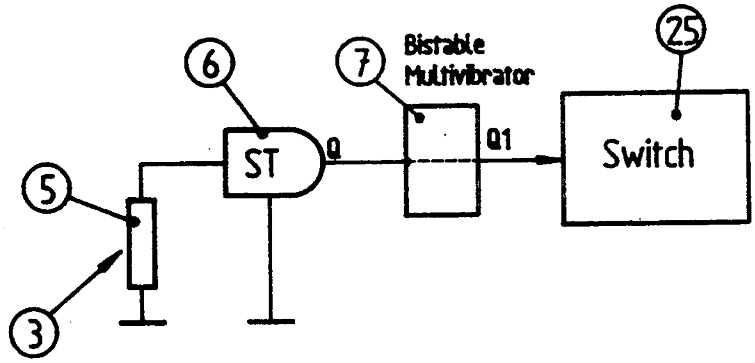
FIG. 2 shows a logic circuit for the device in accordance with FIG. 1.

If a permanent magnet 4 is moved at a small distance past the hearing aid 2, sensor 3 responds and issues a signal to the detector circuit which is formed by the logic circuit as represented in FIG. 2. Said circuit controls the on-off switch 25 of the hearing aid 2.

The logic circuit 6, 7 as shown in FIG. 2 is connected with the sensor 3 built by a coil 5 and comprises a Schmitt trigger 6 arranged behind coil 5, which trigger converts the voltage induced by the movement of the magnet past coil 5 into rectangular pulses. The course of the voltage induced into the coil depends considerably on the distance at which the magnet 4 is moved past sensor 3 and the speed with which this occurs. The prerequisite, however, for this is that the voltage induced into the coil exceeds the threshold of the Schmitt trigger 6.

Behind the Schmitt trigger 6 there is arranged a bistable multivibrator or flip-flop circuit 7 which changes over by each pulse supplied by the Schmitt trigger 6 and whose output signal controls the on-off switch.

Figure 3:
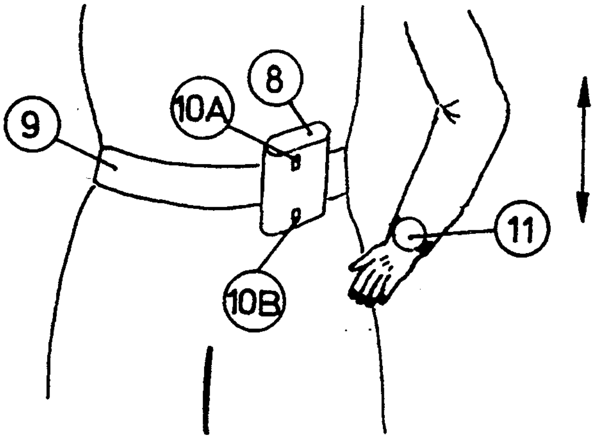
FIG. 3 shows a further application of the remote control device in accordance with the invention in an electronic device.

FIG. 3 shows a box-like electronic apparatus 8 which is attached to a user's belt 9. Apparatus 8 comprises a pair of sensors 10A, 10B which is controllable by a magnet disposed in a wrist-watch 11. In connection with the logic circuit shown in FIG. 4 this pair 10A, 10B of sensors allows recognizing the direction in which the magnet provided in the wrist-watch 11 is moved past said pair 10A, 10B of sensors.

Figure 4:
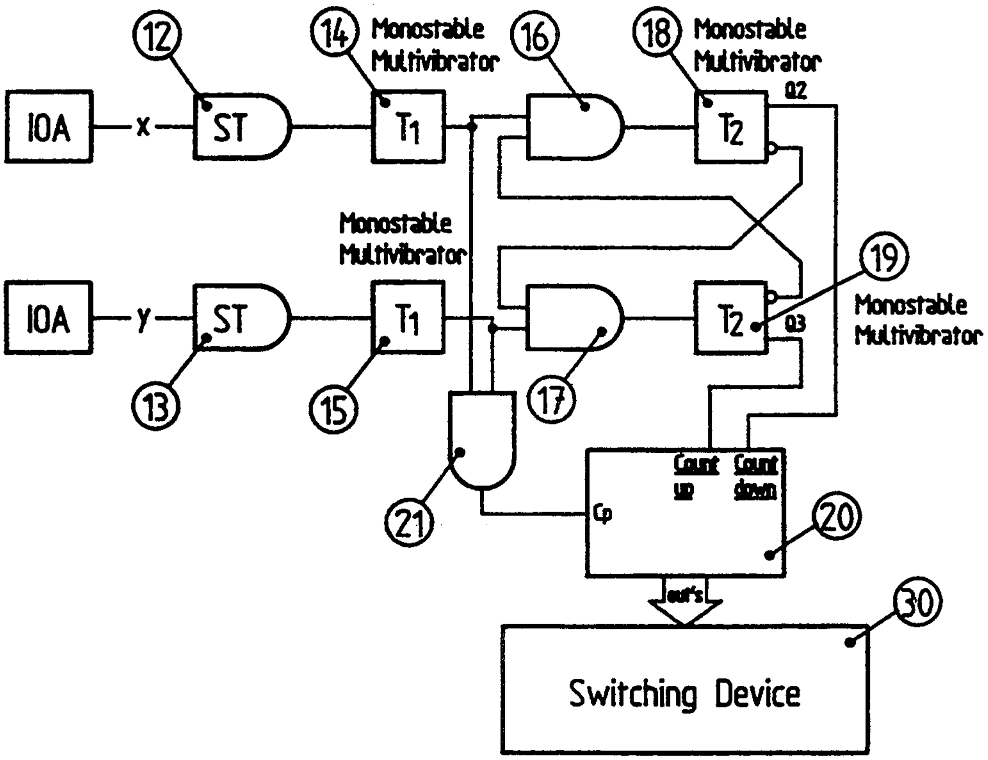
FIG. 4 shows a logic circuit for recognizing several commands.

In the logic circuit as shown in FIG. 4 the outputs X or Y of sensors 10A, 10B are each connected with the inputs of a Schmitt trigger 12, 13 which provide the conversion of the signals supplied by the sensors into rectangular pulses with a defined amplitude.

The outputs of the two Schmitt triggers 12, 13 are each connected with the inputs of two monostable multivibrators 14, 15 which supply pulses of precisely defined length irrespective of the signals supplied by the sensors. The signals of sensors 10A, 10B are practically converted into precisely defined pulses by Schmitt triggers 12, 13 and two monostable multivibrators 14, 15 as soon as the switching threshold of the Schmitt triggers 12, 13 is exceeded by the signals of sensors 10A, 10B.

The outputs of the two monostable multivibrators 14, 15 are connected with a logic circuit consisting of the two AND gates 16, 17 and the two monostable multivibrators 18, 19 disposed behind said circuits, each of these having two outputs of which one is inverted. In order to achieve a mutual interlocking circuit the negated output of each of the two monostable multivibrators 18, 19 are connected with the second input of the AND gates 16, 17 disposed in the respective other branch of the circuit.

The non-inverted outputs Q2, Q3 of the two monostable multivibrators 18, 19 are connected with a counter 20 which, depending on which of the two outputs Q2, Q3 is set to logical "L", increases or decreases its initial value by one if a logical "L" signal reaches the counter input Cp of counter 20 from the AND gate 21. Said AND gate 21 is connected on the input side with the outputs of the two monostable multivibrators 14, 15, so that a change in the output value of the counter 20 may only occur if both sensors 10A, 10B are activated within the runtime of two monostable multivibrators 14, 15. Due to the interlocking circuit 16, 17, 18, 19 it is thus ensured that during any activation of the sensors 10A, 10B only one of these two outputs Q2, Q3 can maintain the condition of logical "L".

Thus, in the state of rest of the logic circuits the inverting outputs of the two monostable multivibrators 18, 19 issue a signal logical "L" which prepares the two AND gates 16, 17 for switching through. In the event of a movement of the magnet arranged in wrist-watch 11 in the direction of the axis connecting the two sensors 10A, 10B, the outputs X, Y of sensors 10A, 10B issue mutually delayed signals. Thus, the two Schmitt triggers 12, 13 also issue pulses at different times, which leads to a time-staggered start of the two monostable multivibrators 14, 15. Thus, however, the AND gate 17, 16 switches through which lies in the branch of the circuit which is connected to the output X, Y of the sensor 10A, 10B where the magnet disposed in the wrist-watch 11 was moved past first. Thus, the monostable multivibrators 18, 19 disposed behind this AND gate 16, 17 changes its state, whereupon its output Q2, Q3 changes from "L" to "H" and, simultaneously, its inverting output from "L" to "H". This, however, blocks the AND gate 16, 17 in the respective other branch, so that the pulse reaching this branch at a slightly later time can no longer trigger the respective monostable multivibrators 18, 19, whose output Q2, Q3 thus remains in "L" and thus determines the counting direction of counter 20.

The output of counter 20 is connected with a switching device or an electronic step potentiometer 30 with which, for example, the amplification of apparatus 8 can be changed. If a further value is to be changed, it is possible to provide a further pair of sensors or three individual sensors with a respective logic circuit.

Figure 5A:
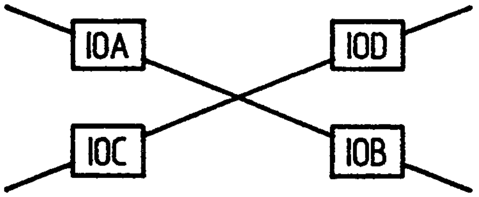
FIGS. 5A and 5B are embodiments showing the sensors' locations.
Figure 5B:
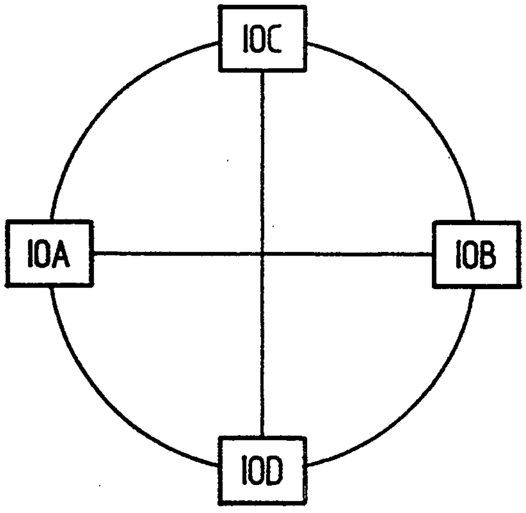

FIG. 5A shows a sensor arrangement where two pairs of sensors are disposed along geometric axes crossing each other. FIG. 5B shows a sensor arrangement where sensors are evenly distributed along a circularly line, the sensors forming pairs disposed diametrically opposite one another.

I claim:

1. A control circuit remotely controlled by a magnetic field for operating a switching device of a hearing aid with predefined switching signals, the control circuit comprising:

(a) at least two sensors located a short distance from each other for individually sensing a magnetic field;

(b) a logic circuit connected to said at least two sensors for generating an output signal dependent on the sequence in which the sensors sense the magnetic field; and (c) a switch controller connected between said logic circuit and the hearing aid switching device for operating the switching device with the predefined switching signals based on the logic circuit output signal.

2. The control circuit of claim 1, further comprising at least two pairs of sensors, each pair of sensors being disposed on an axis, wherein the axes intersect.

3. The control circuit according to claim 2, wherein said switch controller comprises an incremental counter including a control input and two additional inputs and the logic circuit comprises:

(a) a branch corresponding to each sensor, each branch including (i) a first monostable multivibrator coupled to the sensor;

(ii) an AND gate with two inputs, said first monostable multivibrator being connected to one of said two inputs;

(iii) a second monostable multivibrator connected to said AND gate and having two outputs;

(b) an interconnected circuit including (i) two of said branches;

(ii) one of the second monostable multivibrator outputs is connected to the other input of the AND gate in the other branch of the interconnected circuit to block the AND gate;

(iii) a control AND gate having two inputs and an output, said output being connected to said incremental counter control input, each input being connected to a corresponding one of the first monostable multivibrators within the interconnected circuit;

(iv) the other outputs of said second monostable multivibrators within the interconnected circuit being connected to the incremental counter additional inputs;

wherein the incremental counter is adjusted by activating two of the sensors associated with the interconnected circuit within a predetermined period of time so that both first monostable multivibrators activate the control input via the control AND gate, and the second monostable multivibrator, associated with the initially activated sensor, blocks the input to the other second monostable multivibrator and adjusts the incremental counter.

4. The control circuit of claim 2, wherein the sensors are evenly spaced around a circle, each sensor being located diametrically opposite the other sensor of the pair.

5. The control circuit according to claim 4, wherein said switch controller comprises an incremental counter including a control input and two additional inputs and the logic circuit comprises:

(a) a branch corresponding to each sensor, each branch including (i) a first monostable multivibrator coupled to the sensor;

(ii) an AND gate with two inputs, said first monostable multivibrator being connected to one of said two inputs;

(iii) a second monostable multivibrator connected to said AND gate and having two outputs;

(b) an interconnected circuit including (i) two of said branches;

(ii) one of the second monostable multivibrator outputs is connected to the other input of the AND gate in the other branch of the interconnected circuit to block the AND gate;

(iii) a control AND gate having two inputs and an output, said output being connected to said incremental counter control input, each input being connected to a corresponding one of the first monostable multivibrators within the interconnected circuit;

(iv) the other outputs of said second monostable multivibrators within the interconnected circuit being connected to the incremental counter additional inputs;

wherein the incremental counter is adjusted by activating two of the sensors associated with the interconnected circuit within a predetermined period of time so that both first monostable multivibrators activate the control input via the control AND gate, and the second monostable multivibrator, associated with the initially activated sensor, blocks the input to the other second monostable multivibrator and adjusts the incremental counter.

6. The control circuit of claim 1, wherein said switch controller comprises an incremental counter including a control input and two additional inputs and the logic circuit comprises:

(a) a branch corresponding to each sensor, each branch including (i) a first monostable multivibrator coupled to the sensor;

(ii) an AND gate with two inputs, said first monostable multivibrator being connected to one of said two inputs;

(iii) a second monostable multivibrator connected to said AND gate and having two outputs;

(b) an interconnected circuit including (i) two of said branches;

(ii) one of the second monostable multivibrator outputs is connected to the other input of the AND gate in the other branch of the interconnected circuit to block the AND gate;

(iii) a control AND gate having two inputs and an output, said output being connected to said incremental counter control input, each input being connected to a corresponding one of the first monostable multivibrators within the interconnected circuit;

(iv) the other outputs of said second monostable multivibrators within the interconnected circuit being connected to the incremental counter additional inputs;

wherein the incremental counter is adjusted by activating two of the sensors associated with the interconnected circuit within a predetermined period of time so that both first monostable multivibrators activate the control input via the control AND gate, and the second monostable multivibrator, associated with the initially activated sensor, blocks the input to the other second monostable multivibrator and adjusts the incremental counter.

7. A control circuit remotely controlled by a magnetic field for operating a switching device of a hearing aid with predefined switching signals, the control circuit comprising:

(a) at least two pairs of sensors for sensing a magnetic field, each pair of sensors being disposed on an axis with the axes intersecting;

(b) a signal converter connected to said at least two pairs of sensors;

(c) a switch controller connected between said signal converter and the hearing aid switching device for operating the switching device with the predefined switching signals.

8. The control circuit according to claim 7, wherein the sensors are evenly spaced around a circle and each sensor is located diametrically opposite the other sensor of the pair.

9. A control circuit remotely controlled by a magnetic field for operating a switching device of a hearing aid with predefined switching signals, the control circuit comprising:

(1) two sensors for sensing a magnetic field;

(2) an incremental counter having a control input and two additional inputs;

(3) a logic circuit connected to said two sensors for generating an output signal dependent on the sequence in which the sensors sense the magnetic field, the logic circuit includes:

(a) a branch corresponding to each sensor, each branch including:

(i) a first monostable multivibrator coupled to the sensor;

(ii) an AND gate with two inputs, said first monostable multivibrator being connected to one of said two inputs;

(iii) a second monostable multivibrator connected to said AND gate and having two outputs;

(b) a control AND gate having two inputs and an output, said output being connected to said incremental counter control input, each input being connected to a corresponding one of the first monostable multivibrators;

(c) one of the outputs of the second monostable multivibrators being connected to the other input of the AND gate in the other branch;

(d) the other outputs of the second monostable multivibrators being connected to the incremental counter additional inputs; and (e) wherein the incremental counter is adjusted through the additional inputs; and wherein the incremental counter is connected to the hearing aid switching device for operating the switching device with the predefined switching signals.

* * * * *